(12) United States Patent
Volynkin et al.

(10) Patent No.: US 11,570,139 B2
(45) Date of Patent: Jan. 31, 2023

(54) SYSTEM AND METHOD FOR MATCHING AND COLLECTING USER DATA AND/OR USER DEVICE DATA

(71) Applicant: Dexameron Limited (Dexameron Ltd), Nicosia (CY)

(72) Inventors: Ilya Alexandrovich Volynkin, Moscow (RU); Oleg Sergeevich Kopitsyn, Moscow (RU); Sergei Aleksandrovich Vakhotin, Moscow (RU)

(73) Assignee: Dexameron Limited (Dexameron Ltd), Nicosia (CY)

( * ) Notice: Subject to any disclaimer, the term of this patent is extended or adjusted under 35 U.S.C. 154(b) by 0 days.

(21) Appl. No.: 17/227,772

(22) Filed: Apr. 12, 2021

(65) Prior Publication Data
US 2022/0070141 A1  Mar. 3, 2022

(30) Foreign Application Priority Data

Sep. 2, 2020 (RU) .......................... RU2020129084

(51) Int. Cl.
| | | |
|---|---|---|
| *H04L 61/256* | (2022.01) | |
| *H04L 61/2517* | (2022.01) | |
| *H04L 61/5007* | (2022.01) | |

(52) U.S. Cl.
CPC ...... *H04L 61/2571* (2013.01); *H04L 61/2517* (2013.01); *H04L 61/5007* (2022.05)

(58) Field of Classification Search
CPC ............ H04L 61/2571; H04L 61/2517; H04L 61/5007
See application file for complete search history.

(56) References Cited

U.S. PATENT DOCUMENTS 7,376,714 B1   5/2008  Gerken
8,548,820 B2  10/2013  Matz et al.
(Continued)

FOREIGN PATENT DOCUMENTS

AU    2013205470 A1    5/2013
JP       6415458 B2   10/2018
(Continued)

OTHER PUBLICATIONS

International Search Report PCT/IB2021/058029 dated Jan. 7, 2022 (pp. 1-10).
(Continued)

*Primary Examiner* — Philip C Lee
(74) *Attorney, Agent, or Firm* — Millen, White, Zelano & Branigan, P.C.; William Nixon

(57) ABSTRACT

Systems and methods for match and collect user data and/or user device data within a current Internet access session of a user for use by user notification systems that generate, distribute and display informational messages over the Internet. The system includes a source data reception unit configured to receive a source IP address and a source user device port matched with the translated IP address and with the translated port of the operator or the provider from the NAT service. A data matching unit matches user data and/or user device data from all available sources, including but not limited to operator or provider databases, using the received source IP address and the received user device port. The systems and methods provide delivery of informational messages based on collected/matched user data and/or user device data provided to the maximum number of real identified users.

4 Claims, 7 Drawing Sheets

(56) References Cited

U.S. PATENT DOCUMENTS

| | | | |
|---|---|---|---|
| 8,775,391 | B2 | 7/2014 | Kalavade |
| 9,262,367 | B2 | 2/2016 | Yeung et al. |
| 9,621,625 | B2 | 4/2017 | Zinin |
| 10,134,047 | B2 | 11/2018 | Wilson et al. |
| 10,158,908 | B1* | 12/2018 | Ramani ............... H04N 21/4667 |
| 10,290,017 | B2 | 5/2019 | Traasdahl et al. |
| 2007/0217408 | A1* | 9/2007 | Sahashi .................. H04L 45/42 370/389 |
| 2009/0055267 | A1 | 2/2009 | Roker |
| 2010/0161795 | A1* | 6/2010 | Deridder ............... H04L 67/146 709/224 |
| 2011/0161462 | A1* | 6/2011 | Hussain ................ H04L 69/329 709/219 |
| 2012/0246001 | A1 | 9/2012 | Matz et al. |
| 2012/0253950 | A1 | 10/2012 | Parker |
| 2013/0110627 | A1 | 5/2013 | Guha |
| 2013/0318346 | A1* | 11/2013 | Libonate ................ H04L 43/16 713/168 |
| 2014/0032306 | A1 | 1/2014 | Sukornyk et al. |
| 2014/0287757 | A1* | 9/2014 | Borg ....................... H04W 8/26 455/436 |
| 2015/0043430 | A1* | 2/2015 | Garcia Martin .... H04L 61/4588 370/328 |
| 2015/0112767 | A1* | 4/2015 | Shatzkamer ....... G06Q 30/0205 705/7.34 |
| 2017/0251013 | A1 | 8/2017 | Kirti et al. |
| 2018/0034770 | A1* | 2/2018 | Rajagopalan ....... H04L 41/0806 |
| 2019/0297368 | A1 | 9/2019 | Whitehead |
| 2022/0051294 | A1* | 2/2022 | Das ..................... G06Q 20/108 |

FOREIGN PATENT DOCUMENTS

| | | |
|---|---|---|
| RU | 132591 U1 | 9/2013 |
| WO | 2020/097227 A1 | 5/2020 |

OTHER PUBLICATIONS

L. Olejnik et al., "Selling Off Privacy at Auction", (Dec. 6, 2013) HAL ID-00915249, https://hal.inria.fr/hal-00915249—pp. 1-15.

English Abstract of JP 6415458 B2 published Oct. 31, 2018.

English Machine Translation Claims of RU 132591 published Sep. 20, 2013.

\* cited by examiner

SYSTEM AND METHOD FOR MATCHING AND COLLECTING USER DATA AND/OR USER DEVICE DATA

TECHNICAL FIELD

The present invention relates to systems and methods for matching and collecting user data and/or user device data within a current Internet access session of a user for use by user notification systems that generate, distribute and display informational messages over the Internet.

BACKGROUND OF THE INVENTION

Various systems and methods for notifying users via the Internet by means of informational messages are known in the art, such as user notification systems about emergency situations, systems for displaying advertisements, systems for informing about fines and taxes, and the like. In such user notification systems, an important condition is to convey informational messages to the maximum number of users having certain socio-demographic, behavioural and other characteristics (hereinafter referred to as the target audience or TA). The process of defining the characteristics of a potential recipient and selecting the most suitable advertising and informational messages based on his/her characteristics is called targeting.

For instance, various methods and models for displaying Internet advertising are known in the art, including those utilizing targeting, wherein the collection of user information necessary to form a user profile and use targeted advertising, is carried out by analyzing and matching the following data concerning the user and his/her actions:
cookie files;
user keywords and search engine results;
user social network profiles and interests;
data concerning Internet resources visited and user actions in relation to advertising and informational messages (viewing, clicking, closing, etc.);
any other available user/subscriber information, including his/her actions of purchasing and/or paying for goods and services via the Internet.

RU132591U1 discloses a targeted advertising system characterized in that it contains a data collection and profiling unit and an advertising materials management unit connected thereto via a data exchange bus, both units housed on a special server, to which an advertiser interface, an agency interface, an advertising platform interface, an administrative interface, an external partner user data source interface, and a special interface (API) are linked. The prior art solution provides displaying various types of advertising messages to Internet users, taking into account the information regarding socio-demographic user data, their short-term and long-term interests, the user's geographic location, the context of the page with the advertising space, the type of user device and other data characterizing both Internet users and websites on which the advertisements are placed.

A method for identifying a potential recipient of advertising (user/subscriber) and receiving his/her data by comparing cookies available to the advertising exchange (Ad Exchange) and the demand-side platform (DSP) is described in particular in Google's cookie matching protocol (https://developers.google.com/ad-exchangektb/cookie-guide) and Selling Off Privacy at Auction (Lukasz Olejnik, Tran Minh-Dung, Claude Castelluccia.Selling Off Privacy at Auction.2013.hal-00915249).

Various methods and techniques for matching or synchronizing cookies received from various sources, including so-called "third-party cookies" (third-party cookies or tracking cookies), i.e. cookies that are stored on the user's device not directly by the site/domain that the user visits but by other sites/domains, e.g. advertising networks/services, are also known in the art. Such methods and techniques are disclosed, in particular, in JP6415458B2, U.S. Ser. No. 10/134,047B2, U.S. Ser. No. 10/290,017B2, etc. The general principle of "cookies synchronization" includes matching the cookie identifiers from different sources and determining the common user and/or subscriber device corresponding thereto.

The disadvantage of the above methods is that in order to identify a potential recipient (user and/or user device) of advertising and informational messages, cookies and/or other data about the user and/or his/her behaviour are required, including but not limited to: keywords used in Internet searches, user profiles on social networks, history of visited web pages, etc.

Another disadvantage of the above methods is the inability to use them for targeted advertising if during the session the user disables the functions of transferring additional data that can be used to identify the user and determine his/her preferences, including but not limited to: cookies, geolocation parameters, authorization on social networks and the like, on the user device. Similar restrictions on user data collection and storage also arise if the user does not use the browser to receive advertising and informational messages, as, for instance, when using mobile applications with a built-in advertisement display mechanism. There are also additional restrictions on storing and subsequently analyzing third-party cookies, in particular, the following:
third-party cookies are often blocked and/or deleted by security tools or browser settings of subscriber devices, in particular as a result of applying the same origin policy (SOP, also known as the Single Origin Policy);
access by advertising services, user profiling systems and similar systems/services to third-party cookies of various domains is technologically limited as only the domain/service that generated and stored them can "read" (decrypt) data contained in the cookies.

Thus, the lack of data on the basis of which it would be possible to analyze the behaviour and preferences of the user in real time and to match all available user data, including historically accumulated data, makes it impossible to determine the user profile (both in real time and in principle) and to assign it to a specific TA.

There is a number of methods for targeting advertising based on the analysis of history and results of user actions on the Internet, including both regular web browsing and interaction with search engines, online stores, payment systems, etc. For instance, US2013/0110627A1 discloses a method for improving targeting performance based on processing user queries to search engines. The method includes identifying user intentions by analyzing search queries and matching them with advertiser queries in order to select the advertisement that best matches the search query.

Further, U.S. Pat. No. 8,548,820B2 discloses systems and methods for matching user data and history of his/her access to content, thus providing ad targeting. US2014/0032306A1 discloses a method for identifying user parameters required for targeting based on the search history. The method includes collecting data on the user's search queries and sending a corresponding request based on said data to the advertising display system.

A significant drawback of all the above prior art methods based on the analysis of the user's action history is the impossibility of collecting an amount of search history data sufficient for effective targeting if the user disables JavaScript and cookies, does not log into search engines and/or social networks, and thus limits the capabilities of the software to match the current and previous user queries. Lack of data about the user makes it impossible to assign them to any profile defined, e.g., by an advertiser and/or an advertising exchange (AdExchange), and therefore, to display a targeted advertisement for their TA to said user. Methods based on analyzing search queries and other user actions also cannot be used to target advertising and informational messages in mobile applications, as the mechanism for displaying advertising and informational messages in mobile applications cannot receive and process data regarding the user's actions on the Internet made using browser(s) or match user data from the browser(s) and other application (s).

A method for determining and transmitting user data by introducing additional targeting parameters directly into a query for a third party service is disclosed in particular in U.S. Pat. No. 8,775,391B2. This method has significant limitations, as the main requirement for the implementation of the prior art method is the use of the regular HTTP protocol (without the HTTPS protocol extension providing data encryption). Recently, the volume of queries and services supporting the regular HTTP protocol has significantly decreased due to the low level of data security, and all major services managing user data, including advertising services, have switched to using the HTTPS protocol which is not supported by the prior art method. In turn, the above switch made the methods described in the aforementioned U.S. Pat. No. 8,775,391B2 and methods similar thereto not applicable in practice, since requests passing over SSL (HTTPS) are encrypted, and therefore no third-party service can process these requests as they are encoded with a certificate tied to a specific domain, and all existing modern browsers detect and reject replies containing signs of certificate spoofing.

U.S. Pat. No. 9,262,367B2 and U.S. Pat. No. 9,621,625B2 disclose methods for identifying a user device using special means (services) are known, in particular, a proxy server or an analogue (according to U.S. Pat. No. 9,262,367B2) and a special "Discovery Server" service (according to U.S. Pat. No. 9,621,625B2), queries addressed to which are forwarded by DNS-spoofing a special set of domains in order to enable matching of user device data from various sources.

A significant drawback of the above methods is that they require installing special means for intercepting and processing third-party traffic into the operator or provider network perimeter, which can slow down transmission and processing of data for targeting, potentially making it impossible to carry out the processing in real time. The methods described in the above patents also imply interception and preliminary processing of HTTP traffic, but the use of the extended HTTPS protocol does not allow the use of such service features for interception and preliminary processing of traffic in practice, as requests passing over SSL (HTTPS) are encrypted, and therefore no third-party service can process these requests as they are encoded with a certificate tied to a specific domain. The implementation of these methods for the HTTPS protocol is possible only if a third party transmits its certificate to such a service in order to decrypt traffic, but in this case the required level of data transmission security is not ensured (as the certificate itself is compromised) and therefore, the use of the methods disclosed in the above patents with the HTTPS protocol is near-impossible.

Considering the ever-increasing volume of advertising and informational messages on the Internet and the requirements for improved effectiveness of user notification systems, as well as the desire of Internet users to restrict the access of various software to their personal data, including but not limited to: registration data, social network profiles, cookies, search histories, browsing and other Internet activity, and to avoid seeing advertisements on web pages and in applications, including mobile applications, for instance using various ad blocking tools, there is a need for means providing the following in real time:

analyzing and matching user (subscriber)/user device data with user notification system queries, ensuring the best possible relevance of informational messages, including advertising, for a specific user during a specific browsing or application use session, even in conditions when the user (subscriber) is trying by all available means to limit the ability of computer systems to collect and analyze his/her personal data, confirming that the informational message query, including advertising queries, belongs to a real user/subscriber, which makes it possible to identify "bots" and other means of deceiving user notification systems and thus counteract them.

SUMMARY OF THE INVENTION

The object of the present invention is to provide a system for matching and collecting user data and/or user device data within a current Internet access session of a user, the system interacting with an operator/provider device and used for a user notification system that generates informational messages in real time.

The present technical solution ensures collecting and matching of data and/or user device data and identification of the user and/or the user device in real time, including in conditions where the ability to collect and match data and user identification are limited by the user, the owner of the Internet resource and other parties. Thus, the user notification systems provide informational messages to the users based on collected/matched user data and/or user device data is provided according to the present system, method and medium to the maximum number of real identified users.

Further, user identification in real time provides highly effective counteraction to "bots" and other means of deceiving user notification systems when distributing advertising and informational messages.

According to the first aspect of the present invention, there is disclosed a system for matching and collecting user data and/or user device data within a current Internet access session of a user, the system interacting with an operator device or a provider device and used for a user notification system that generates informational messages in real time, the system comprising: a query reception unit configured to receive a user data query from the user notification system, the user data query containing a translated IP address and a translated port of the operator or the provider; a query direction unit configured to direct a query containing the translated IP address and the translated port of the operator or the provider to a service of the operator device or the provider device, the service comprising the NAT service carrying out network address translation (NAT—Network Address Translation; https://ru.wikipedia.org/wiki/NAT); a source data reception unit configured to receive the source IP address and a source user device port from the NAT service, the source IP address and the source user device port being matched with the translated IP address and the translated port of the operator or the provider; a data matching and collection unit configured to match user data and/or user device data from all available sources, including but not limited to operator or provider databases using the received source IP address and the received source user device port, and to collect the matched user data and/or user device data from said available sources; and a collected data direction unit configured to direct the collected matched user data and/or user device data to the user notification system.

According to an embodiment of the present system, the data matching and collection unit is configured to determine a unique user identifier (UID) and to determine data corresponding to the UID based on the source IP address and the source the user device port.

According to another embodiment of the present system, the data matching and collection unit is configured to match the data matched using the source IP address and the source user device port and stored in a first database with data stored in a second database.

According to some embodiments of the present system, the available data sources include various means and enterprise information systems (EIS), including but not limited to: browsers, download managers, mobile and desktop applications, CRM, DMP, DPI.

According to a second aspect of the present invention, there is disclosed a method for matching and collecting user data and/or user device data within a current Internet access session of a user, the method used with an operator device or a provider device and used for a user notification system that generates informational messages in real time, the method comprising: receiving a source IP address and a source user device port and a corresponding translated IP address and a translated port of the operator or the provider from the operator device or the provider device carrying out network address translation (NAT) if it corresponds to preset settings; receiving a query for reception of the user data and/or the user device data from the user notification system, the query containing the translated IP address and the translated port of the operator or the provider. If the source IP address and the source user device port are not previously received from the NAT service according to preset settings, the method comprises directing a query to the NAT service and receiving the source IP address and the source user device port from the NAT service based on the translated IP address and the translated port of the operator or the provider matched therewith; the method further includes matching user data and/or user device data from all available sources, including but not limited to operator or provider databases, using the received source IP address and the received source user device port, collecting matched user data and/or the user device data from said available sources and directing the collected matched user data and/or the user device data to the user notification system.

According to an embodiment of the present method, a unique user identifier (UID) and data corresponding to the UID are determined based on the received source IP address and the source user device port, and the matched user and/or the user device data is collected using the unique user identifier (UID) and the data corresponding to the UID.

According to another embodiment of the present method, the data sources include various means and enterprise information systems (EIS), including but not limited to: browsers, download managers, mobile and desktop applications, CRM, DMP, DPI.

According to a second aspect of the present invention, a computer readable media medium is disclosed, the medium having stored thereon instructions to implement the above method/Thus, the present system, method and medium allow to identify a potential recipient (user and/or user device) of targeted advertising or informational messages in real time due to the ability of the present system, method and medium to query the NAT service to receive the source IP address and the source user device port in real time and to receive them from the NAT service, and further due to linking of the source and translated IP addresses and ports in real time. In particular, the initial data received from the NAT service is used by the present, method and medium as a basis for searching and matching any other user data and/or user device data available in various sources and collecting the matched user data and/or user device data in real time, which allows various user notification/information systems to receive data that they cannot receive by other means and methods, e.g. in the absence of cookies and/or other data about the user and/or his/her behaviour, including but not limited to: keywords used to find information on the Internet, user profiles on social networks, history of visited web pages, etc.

Moreover, the present system, method and medium assist in counteracting "bots" and other means of deceiving advertisers when distributing advertising and informational messages; namely, the present, method and medium allow to receive confirmation that a query, e.g. for advertising, belongs to a real user due to the possibility of matching the translated and source IP addresses and ports in real time. The positive effect of counteracting "bots" serves to increase the effectiveness of advertising and informational messages, namely, to increase the percentage of advertising and informational messages displayed to real users out of the total number of displays of said advertising and informational messages.

In addition to the present system, method and medium contributing to more effective targeting of advertisements and informational messages in real time, the system, method and medium can further effectively operate using any protocols of the TCP/IP stack, including HTTPS.

Further, the present, method and medium are configured for providing identification of a potential recipient (user and/or user device) of targeted advertising and informational messages equally successfully when using browsers or mobile applications.

Therefore, based on the present system, method and medium, it is possible to target advertising, inform users about any emergencies or provide necessary information to relevant users, including information about fines, taxes, etc.

BRIEF DESCRIPTION OF THE DRAWINGS

In order to provide a more detailed description of the present technical solutions in the embodiments of the present invention, the accompanying drawings required for the description thereof are briefly described below. It should be noted that the drawings further illustrate only some of the embodiments of the present invention, which can be modified and combined with each other without departing from the spirit and scope of the present invention.

DETAILED DESCRIPTION OF THE INVENTION

Figure 1:
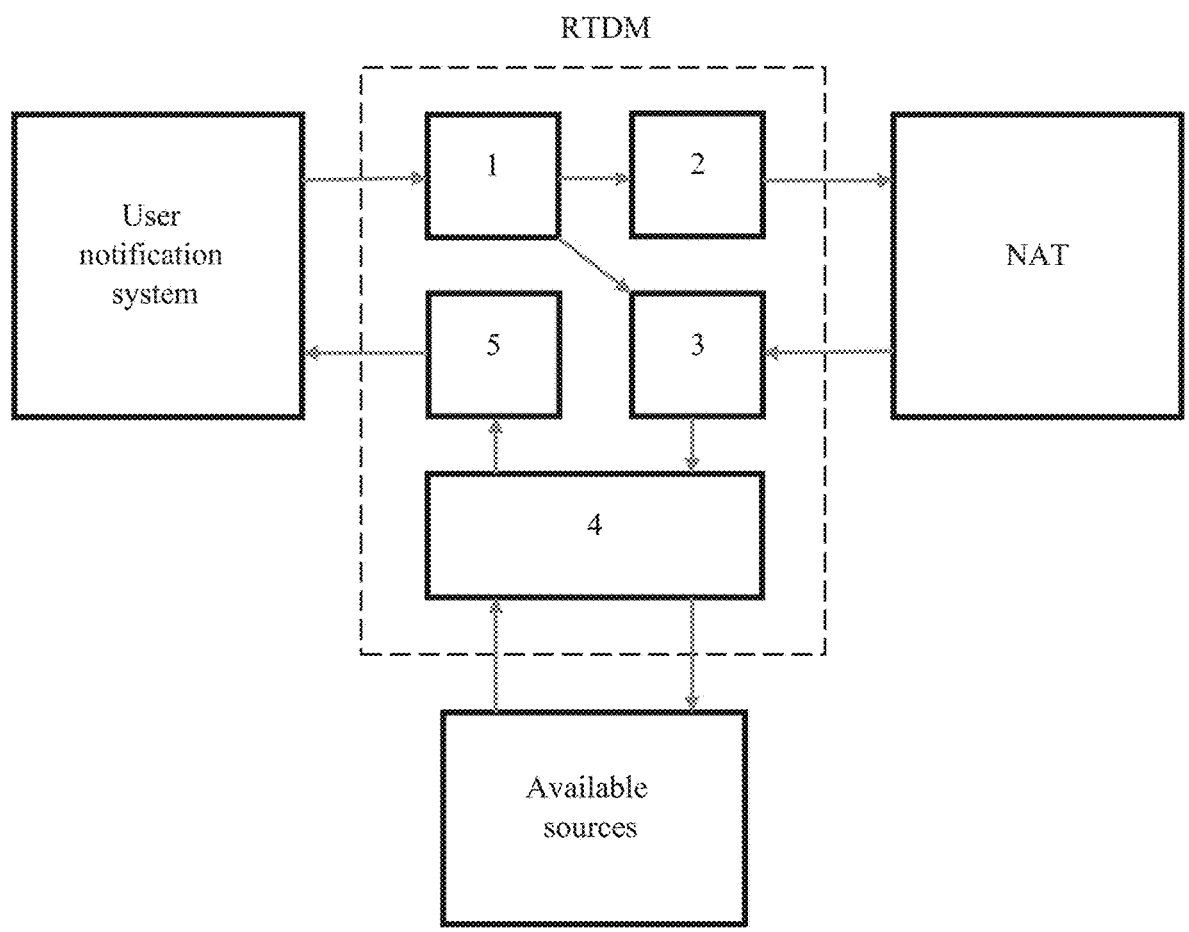
FIG. 1 is a block diagram of the present system for matching and collecting user data and/or user device data according to an embodiment.

The present invention is further described in more detail with examples of embodiments of a system, method and medium for matching and collecting data for a user notification system that functions as an advertising display system. However, the scope of the present invention is not limited to the proposed embodiment and can be applied to any other user notification system known to those skilled in the art, including an emergency notification system for notifying about bad weather, fire in specific shopping centres or residential buildings, terrorist attacks, as well as fines, taxes and more.

The present invention is a software or a hardware/software complex which in this embodiment is configured to identify, to match, to collect and to send information about the subscriber/user of the network and his/her device to advertising display system(s) in real time in amounts sufficient for targeting the advertising directed to the user or his/her device in real time.

The present description discloses an embodiment for distributing advertising on the Internet using the real-time-bidding (RTB or programmatic buying) mechanism, wherein, when a user (subscriber) accesses an Internet resource (site) or a mobile application, a query is sent in real time to the so-called "advertising exchange" (an ecosystem consisting of three components: a supply side platform (SSP), a demand side platform (DSP), and a data management platform (DMP)) which selects targeted advertising to be displayed to a given user based on his/her specific characteristics and his/her device. The interaction rules for the participants in the RTB system, including technical parameters and data transfer conditions, are generally governed by the OpenRTB protocol or similar protocol specific to a particular ecosystem. The determination and selection of an advertising message to be displayed to a specific user (targeting) is based on the so-called "user profile", including, e.g. socio-demographic characteristics, time and place of access to the network/resource, history of search queries and/or previous advertisement displays, and other parameters.

In the present description, the terms "communications service operator", "provider", "network owner" are used to refer to a communications service provider that implements access to the Internet. According to an aspect of the present invention, the disclosed complex relates to the software/hardware of the communications service operator.

The terms "subscriber device", "network user device" refer to a device or a user device through which the user connects to the provider network and accesses the Internet.

The terms "advertising platform", "advertising service" refer to a system of methods and means, including software/hardware, that provide distribution and display of advertising and informational messages on the Internet.

The term "third party" refers to any other participants in the data exchange during a Internet access session of a user with the exception of the user/subscriber and his/her device (first party), and the operator or provider providing said user with access to the Internet (second party). In particular, the third party in the present system, in the case of utilization thereof in the RTB system, is, e.g. SSP, DSP or an Internet resource (website, etc.) which the user is accessing.

Further, "setting" should be understood as the adaptation of the method of interaction of the present system to a specific type of equipment, as well as business processes, rules and requirements of the operator or provider. The settings can be set and changed by the company wherein the proposed system is installed, or directly by the operator/provider. The settings can further be changed and set by the participants of the targeting and advertising display system, but in this case the settings will depend on agreements with the operator/provider.

It should be noted that the present invention can be used not only with the Internet, but also in any other networks based on the TCP/IP protocol suite (https://ru.wikipedia.org/wiki/TCP/IP).

Figure 2:
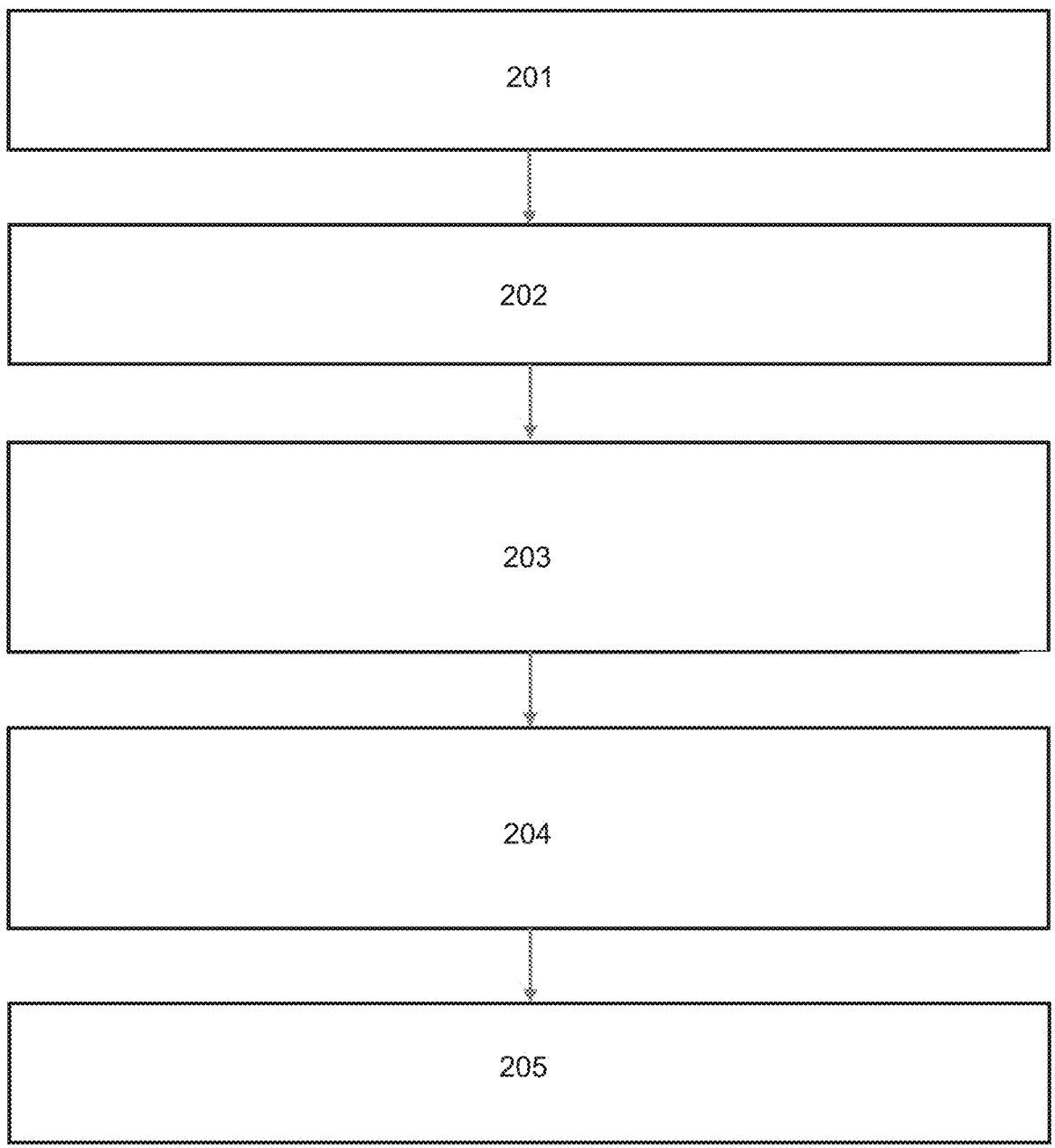
FIG. 2 is a block diagram of the present method for matching and collecting user data and/or user device data according to an embodiment.

In FIGS. 1 and 2 is shown the system for matching and collecting user data and/or user device data within a current Internet access session of a user, the system interacting with an operator device or a provider device and used for a user notification system that generates informational messages in real time. The system comprises: a query reception unit 1 configured to receive a query for reception of user data and/or user device data from a user notification system, the query containing the translated IP address and port of the operator or provider, the query reception unit 1 relates to step 202 shown in FIG. 2; a query direction unit 2 configured to, if the source IP address and source user device port were not previously received from the NAT service, direct a query to the NAT service to receive the source IP address and the source user device port from the NAT service based on the translated IP address and port of the operator or provider matched with hem, the query direction unit 2 relates to step 203; a source data reception unit 3 configured to receive the source IP address and the source user device port matched with the corresponding translated IP address and the translated port of the operator or the provider from the NAT service if it corresponds to present settings, the source data reception unit 3 relates to step 201; a data matching and collection unit 4 configured to match user data and/or user device data from all available sources, including but not limited to operator or provider databases using the received source IP address and source user device port, and to collect the matched user data and/or user device data from said available sources, the data matching and collection unit 4 relates to step 204; and a collected data direction unit 5 configured to direct the collected matched user data and/or user device data to the user notification system, the collected data direction unit 5 relates to step 205.

Figure 3:
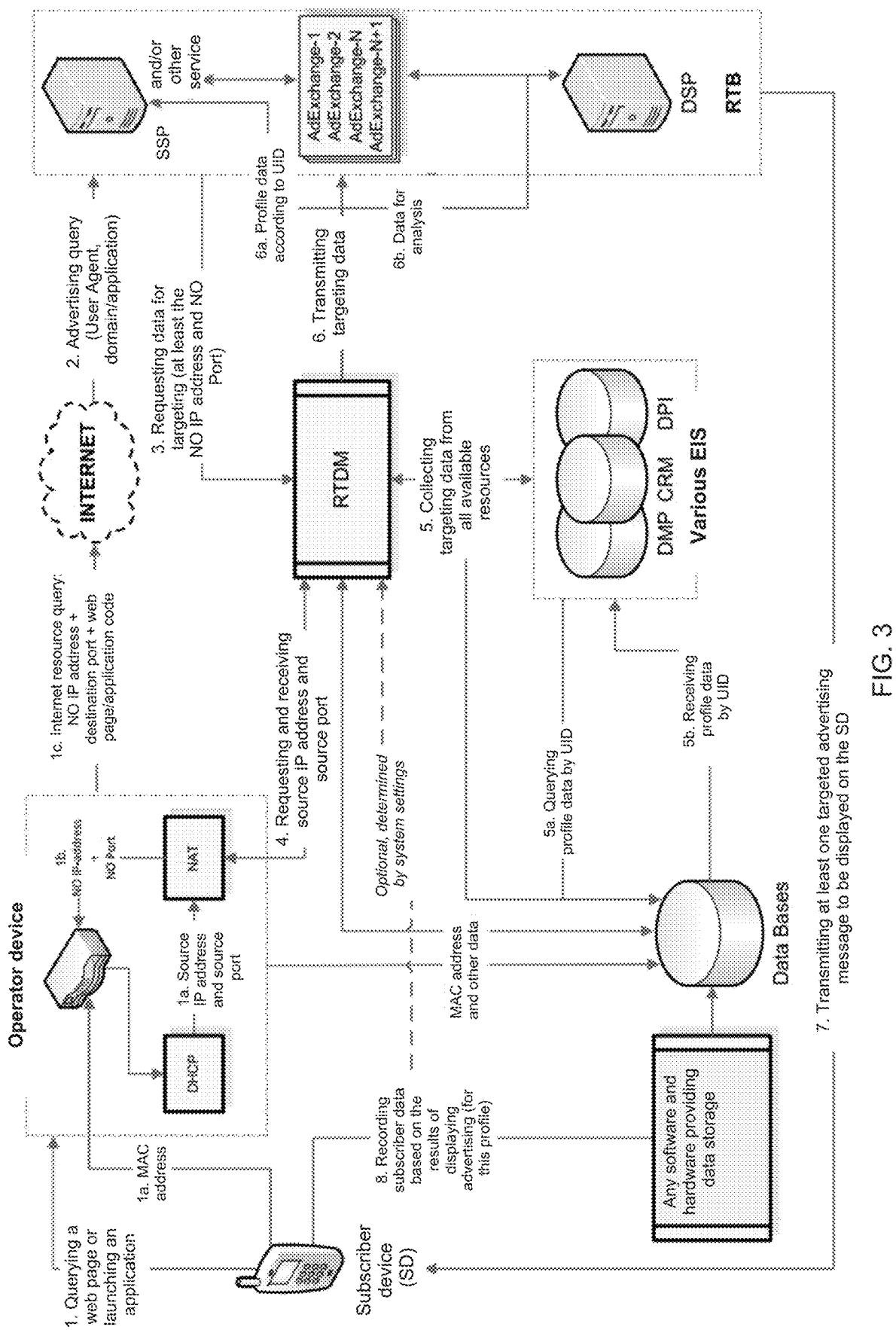
FIG. 3 is a general flowchart illustrating the interaction between the present system for matching and collecting user data and/or user device data, an operator device or provider device and an advertising display system according to an embodiment.

According to FIG. 3, the general flowchart includes the system for matching and collecting user data and/or user device data in real time (referred to as "RTDM" in FIG. 3)

as well as the user device (referred to as "Subscriber device" in FIG. 3), the operator device or provider device (referred to as "Operator device" in FIG. 3) comprising a service carrying out network address translation (NAT), an advertising display system (referred to as "RTB" in FIG. 3), and available sources (referred to as "various EIS", "Databases" and "any software and hardware providing data storage" in FIG. 3) storing data concerning the corresponding user profile. The data stored in said available sources can be used for data matching by the RTDM data matching unit, and can also be collected by the RTDM matched data collection unit.

The NAT service is configured to replace the source IP address and the source user device port (Client IP address and Source Port on Client) with the translated IP address and the translated port of the operator or the provider (NO IP address and NO Port) and to send the source IP address and the source user device port and the corresponding translated IP address and translated port of the operator or the provider to the source data reception unit of the RTDM system, wherein said data is transferred immediately after said replacement or upon query by the query direction unit from the RTDM system, depending on the preset settings. It should be noted that the RTDM system can include a database for storing current NAT translations, in particular for storing and subsequently using the collected user data and/or user device data.

The operator device or provider device is configured to send a user query to the Internet (referred to as "Internet" in FIG. 3), the query containing the code of the Internet resource queried by the user. This code contains a query for advertising content which is subsequently sent to the advertising display system (referred to as "RTB" in FIG. 3). Moreover, both the user query to the Internet and the advertising content query contain the translated IP address and the translated port of the operator or the provider.

The advertising display system is configured to receive an advertising content query containing the translated IP address and the translated port of the operator or the provider, and send a user data query also containing the translated IP address and the translated port of the operator or the provider to the query reception unit of the RTDM system. The advertising display system is further configured to receive the collected data of the RTDM system collected for the corresponding user profile from the direction unit. In this case, the advertising display system is configured to generate targeted advertising content for the corresponding user based on the data received from the RTDM system.

The principle implemented according to the present method is as follows. When connecting and/or authorizing in the communications network in order to gain access to Internet resources, the user registers (transfers a certain set of data to the provider) and/or authorizes in the network using one of the methods available from the provider. As a result of authorization in the network, an unambiguous connection is established between the IP address issued by the provider to the subscriber (user) device (hereinafter referred to as the subscriber device or SD) and the identifier of the device or subscriber (user), allowing to unambiguously match requests from the issued IP address (Client IP address) to a specific subscriber and device.

Then the subscriber requests access to a specific Internet resource through a specific SD (by entering the address into the browser line or clicking on a link) or launches an application (or the application is executed by their SD in the background) which requests any data via the Internet or transmits any data via the Internet (denoted as 1 in FIG. 3). Any query sent by the subscriber device from the internal operator or provider network to the Internet passes through the operator or network provider device (referred to as "Operator Device" in FIG. 3) carrying out network address translation (NAT).

Therefore, the source IP address and source port (Client IP address and Source Port on Client, denoted as 1*a* in FIG. 3) are replaced by the translated IP address and the translated port of the operator or the provider (NO IP-address— Network Operator IP-address and NO Port—Network Operator Port, respectively) of the corresponding AS (Autonomous System) subnet belonging to the corresponding operator/provider (denoted as 1*b* in FIG. 3). Said data, along with query destination information, is transmitted to the RTDM system in real time or on demand. The NAT service stores the original Client IP address and Source Port on Client in the NAT table along with the translated NO IP address (Network Operator IP address) and NO Port (Network Operator Port), and possibly also with the destination address and port of the Internet resource queried by the subscriber.

If a firewall is installed in the network and/or the DPI (Deep Packet Inspection) technology or another operator device or provider device that allows registering the network activity of subscribers are used, subscriber actions in the network are recorded and associated with the IP address of the SD and are transmitted to the RTDM system in real time automatically or on demand (depending on network settings and the operator or provider requirements). As a result, SD and subscriber data (including but not limited to: MAC address, IP address, User Agent, destination port(s) and domain (s)) can be received by the RTDM system and directed/stored in various information systems and/or databases depending on network configuration and the rules set by the operator or provider (referred to as "Various EIS" and "Databases" in FIG. 3). If the operator or provider has additional traffic monitoring and analysis tools (including but not limited to: DPI, APM (Application Performance Management/Monitoring)), query and subscriber data are also stored in the corresponding databases of the specified enterprise information systems (EIS) (referred to as "Various EIS" and "Databases" in FIG. 3).

After converting network addresses from the operator or provider network, an Internet resource query is sent to the Internet containing NO IP address, NO Port, destination port, code of the resource queried by the user (web page and/or application) which may contain query(ies) for third party advertising services/domains (denoted as 1*c* in FIG. 3). At the same time, the source IP address and source port, as well as SD and subscriber data (including but not limited to: MAC address, IP address, User Agent, destination port(s) and domain (s)) are made available to the RTDM system.

The query for third party advertising services/domains contained in the code of the resource (website) or application queried by the subscriber enters the corresponding system (denoted as 2 in FIG. 3). In accordance with the TCP/UDP network protocols, said query must contain the NO IP address and NO Port assigned earlier by the NAT service, as well as the destination IP address(es) and port(s). Further, if the query is implemented over the HTTPS (or HTTP) protocol, it may or may not contain other SD and subscriber identifiers, on the basis of which the system can target advertising (User Agent, cookie files, etc.).

The advertising display system (referred to as RTB in FIG. 3) sends query for receiving targeting data to the RTDM system, the query containing at least the NO IP address and NO Port (denoted as 3 in FIG. 3). The ability to send a query in order to receive the "internal" IP address of a specific subscriber device during a session and to process a response from the NAT service is inherent in the functionality/code of the RTDM system.

Based on the received queries and the data contained therein, the RTDM system requests and receives from NAT the source IP address and source port of the SD which are unambiguously associated with the IP address and port of the operator or the provider (NO IP address and NO Port) if the NAT service has not previously provided data (denoted as 4 in FIG. 3) according to the preset settings. It should be noted that the interaction pattern between the RTDM system and the NAT service can be quite particular, and it particularly depends on the type of router or other service implementing NAT. In general, the RTDM system receives a data stream from a router containing NAT translations at the time of their establishment using the netflow or ipfix protocol, or from other equipment/service providing NAT functionality.

Based on the received source IP address and source port of the SD and other data available in the advertising display system, the RTDM system, by exchanging data with the operator device or provider devices/services or using previously transmitted and stored data, determines the unique subscriber identifier (UID) within the current session and their corresponding data/profiles and then collects data for targeting advertising for the corresponding subscriber profile(s) from all available sources (denoted as 5a and 5b in FIG. 3), including but not limited to: CRM, DMP and other various EIS, operator or provider databases, etc.

The RTDM system transfers advertising targeting data collected for said subscriber/device profile to the advertising display system (RTB) (denoted as 6 in FIG. 3). Furthermore, the RTDM module can transfer all collected data or only data necessary for the advertising display system that corresponds to the settings and meets the requirements set by the operator or provider. The settings are particular and depend on the method of implementation and/or installation of the RTDM system and the requirements set by the data "consumer", i.e. a participant in the advertising display system (DSP, SSP, advertising exchange, etc.).

Depending on the specific implementation of the solution, further data processing in the advertising display system can be carried out in various ways:

a) If the RTDM system is connected directly to the SSP platform, the advertiser's AdServer or any other third party service, the RTDM system receives a query for targeting data and returns the subscriber profile data for targeting directly to the SSP platform, the advertiser's AdServer or any other third party service.

b) Otherwise, the advertising display system receives from the RTDM system and analyzes the composition and quality of the received targeting data. Based on the results of the analysis, the advertising display system can perform the following actions:

if the RTDM system is not connected to the SSP exchange, the query is sent to the DSPs connected thereto in order to receive bids and conduct an auction:

(a.i.1) If one of the DSPs is connected to the RTDM system, it can send a bid request to the RTDM system or otherwise receive additional information regarding the query in the RTDM system.

(a.i.2) By comparing timestamps and associated data previously stored or received from the operator device or provider devices/services with data received in the bid request or within the interaction protocol with the DSP, RTDM system matches queries and determines the SD identifier. If an unambiguous match is found between the query and the SD, the system transmits the corresponding SD/subscriber profile data to the DSP for targeting the advertising display, and the RTDM system does not further participate in the selection and display of the targeted advertising message.

if the RTDM system is connected to an advertising/SSP exchange (referred to as "AdExchange-1-AdExchange-N+1" in FIG. 3) as a DSP using the OpenRTB protocol or a similar protocol, the exchange service receives a generated bid request which contains at least the query source IP subnet and the domain/service on which the advertising display is traded:

(1) By comparing timestamps and associated data previously stored or received from the operator or provider services with data received in the bid request, the RTDM system matches queries and determines the SD identifier. If an unambiguous match is found between the query and the SD, the query is enriched with the corresponding data and is transmitted to the connected DSPs in order to receive display bids;

(2) From the received bids, the RTDM system selects the maximum bid received within the allowed period of time set in the advertising display and/or SSP system, subtracts the preset service margin and transmits the selected bid data as a response to the initial query of the advertising/SSP exchange, including additional parameters received from the DSP.

Regardless of the embodiment of the solution, the collection and processing of the above data occurs in real time (the total time from the receipt of the query from the advertising display system in the RTDM system to sending additional data for targeting does not exceed 100 ms). As a result, the corresponding service processes the received data and selects a targeted advertising message to be displayed on the SD in real time.

After the advertising display system has generated targeted advertising content, it transmits at least one targeted advertising message to the SD for displaying (denoted as 7 in FIG. 3).

According to the results of displaying the advertising message, the display data is saved in the database(s) for further use by the RTDM system and other services when targeting advertising (denoted as 8 in FIG. 3). The data is entered into the databases using any software and hardware providing data storage. In an embodiment, the data is stored directly in the RTDM system but storing data directly in the RTDM system is optional and depends on global system settings.

It should be noted yet again that the RTDM system can equally effectively function when installed not only within the operator or provider network perimeter, but also outside the network perimeter, including in the advertising display system, in the SSP/DSP and as service independent from the operator or provider. The present invention can be implemented in the following ways:

as separate software installed on the server(s) of the operator or the provider and on the servers(s) of companies providing online advertising display;

as an addition to specialized hardware and software systems carrying out various network activity monitoring and network traffic analysis functions, including but not limited to: firewalls, DPI (Deep Packet Inspection) tools, etc.;

as specialized software installed in the operator or provider network and processing data from the border router which implements the NAT functionality.

Therefore, the RTDM system can be used both by the operator/provider and by any participants in the entire ecosystem of displaying targeted advertising. It should be noted that the above embodiments for implementation and/or installation of the RTDM system confirm its flexibility and compatibility with different systems.

Figure 4A:
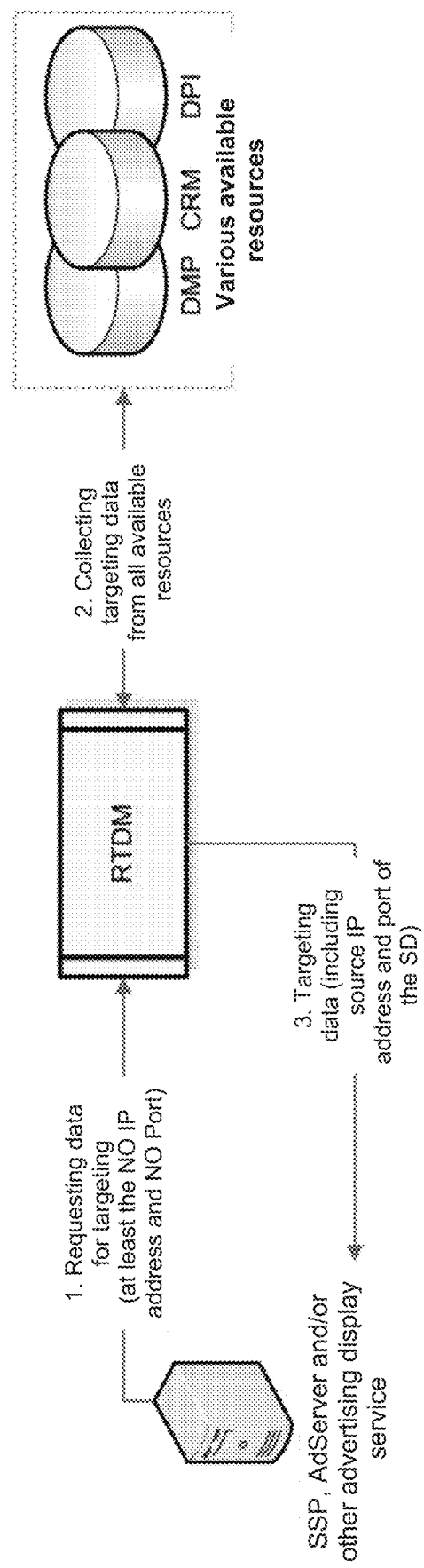
FIG. 4A is a flowchart illustrating the process of connecting the system for matching and collecting user data and/or user device data with an advertising display system according to an embodiment.
Figure 4B:
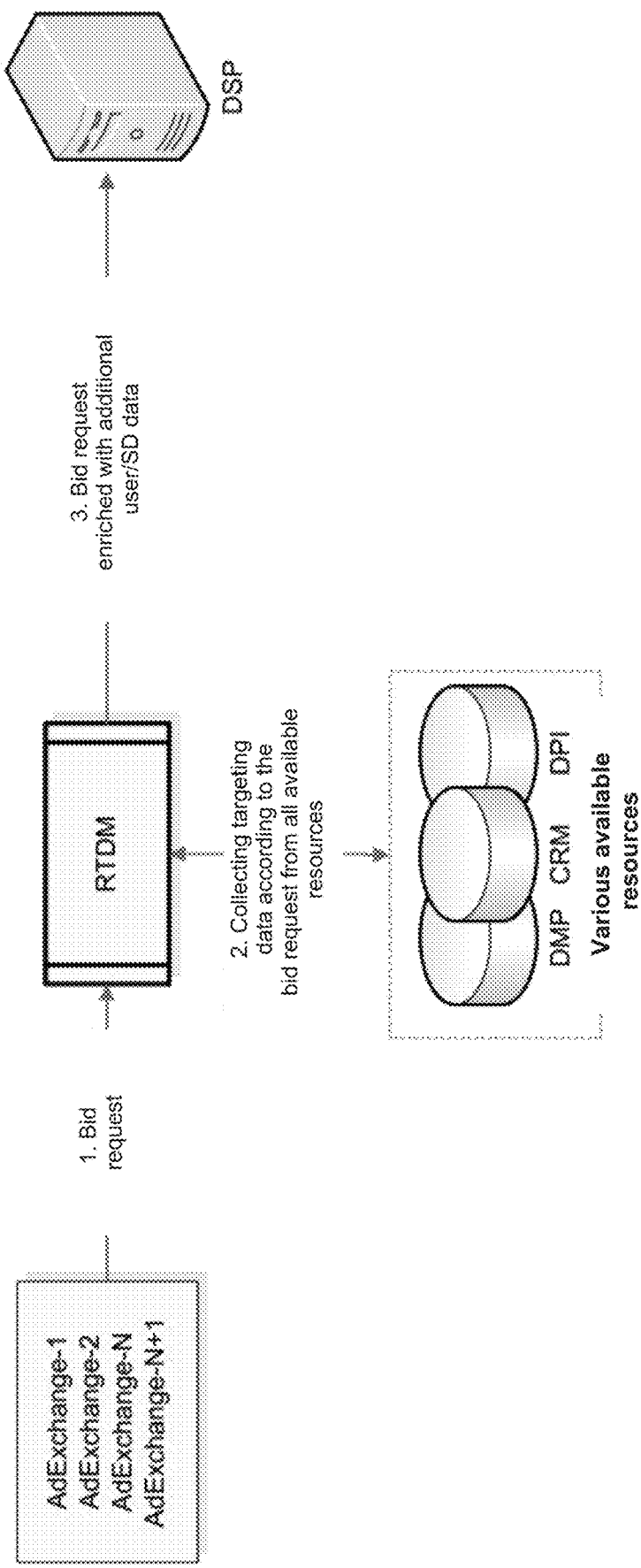
FIG. 4B is a flowchart illustrating the process of connecting the system for matching and collecting user data and/or user device data between AdExchange and DSP according to an embodiment.
Figure 4C:
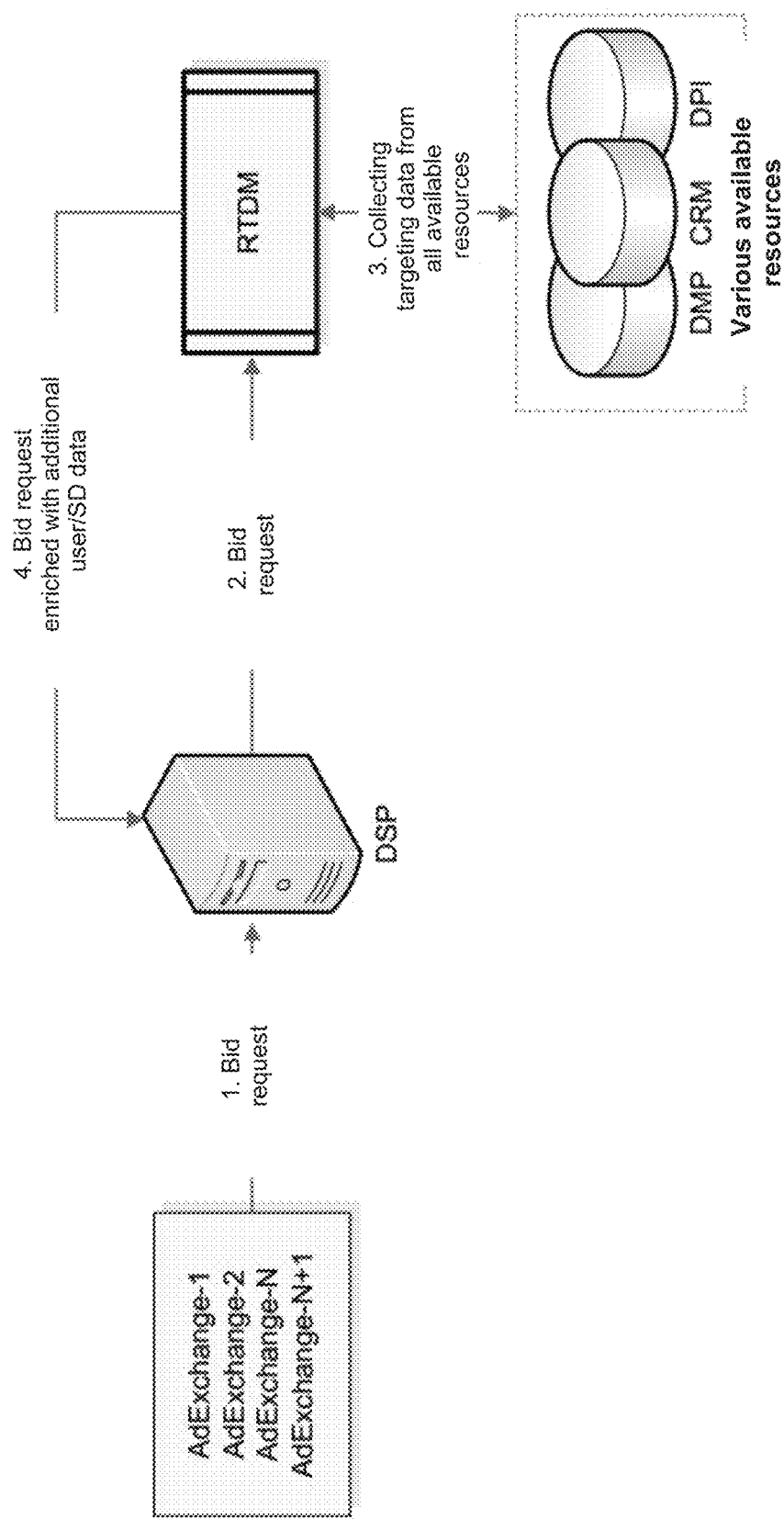
FIG. 4C is a flowchart illustrating the process of connecting the system for matching and collecting user data and/or user device data with DSP according to an embodiment.
Figure 4D:
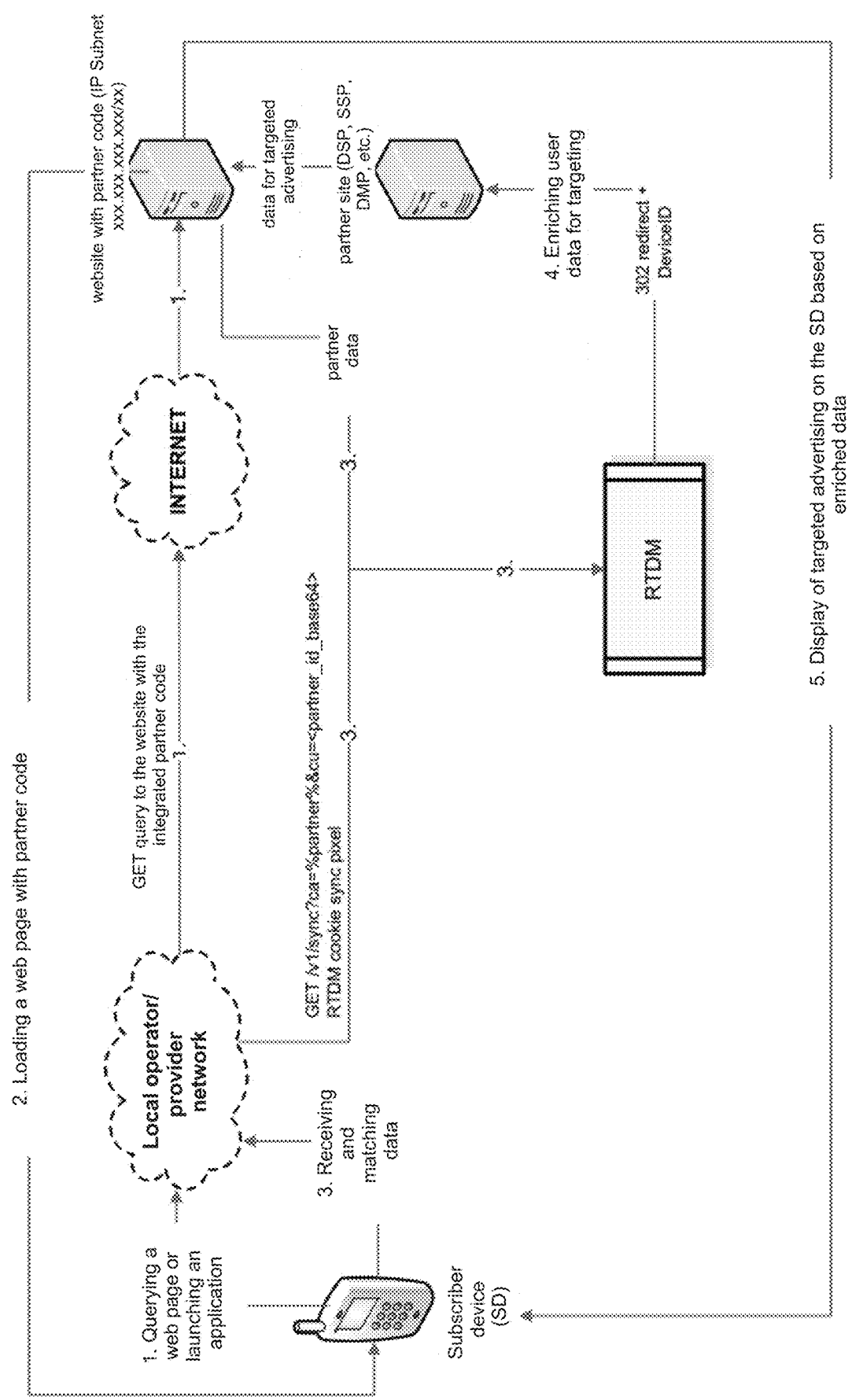
FIG. 4D is a flowchart illustrating the process of connecting the system for matching and collecting user data and/or user device data as an independent cookie synchronization (matching) service according to an embodiment.

In particular, the following embodiments of the present solution are contemplated, depending on the needs and policies of the advertising display systems and/or the operator or provider. The various embodiments are categorized according to types of connection and the available data:

- RTDM connects to SSP, the advertising display system (AdServer) and/or other service and thus provides said services with specific data (including the source/local IP address and port of the SD) which neither SSP nor other advertising services can receive in other ways in real time. In this embodiment, RTDM provides both advertising targeting and confirmation to the advertiser that subscribers who receive advertising meet the advertiser's requirements for socio-demographic, geolocation and other parameters for targeting. The general chart illustrating this solution is shown in FIG. 4A.
- RTDM is installed between the ad exchange and the DSP. In this case, the RTDM can receive a bid request, supplement it with user/SD data which neither the advertising exchange nor the DSP can receive in other ways, and transmit the enriched request to the DSP in the same manner as done by the SSP but with additional data. In this case, RTDM allows to bypass the restrictions on the transfer of certain subscriber/SD data to external systems set by the policies and rules of the owner of the Internet resource. The general chart illustrating this solution is shown in FIG. 4B.
- RTDM connects directly to DSP. In this case, the DSP processes the bid request, enriching it with data received using the RTDM, and therefore ensures that the bid request more closely matches the advertiser's requirements. The general chart illustrating this solution is shown in FIG. 4C.
- RTDM operates as an independent service with a known domain or IP address on the Internet and uses generally accepted cookie synchronization mechanisms to transfer user recognition data to third-party systems without directly using the cookies themselves. The general chart illustrating this solution is shown in FIG. 4D.

In each of the embodiments of the implementation/installation of the RTDM system, the capabilities of some participant in the advertising display system are expanded; in general, the RTDM system has the ability to provide additional data to each participant in the advertising display system for more accurate targeting.

It should be noted that regardless of the subscriber device settings and the embodiment used, the present solution for performing advertising targeting can detect, collect, analyze, match and direct various data to the advertising display system, the data including but not limited to:

- physical device identifiers (MAC address, network profile identifier, IMEI, IMSI, MSISDN and others);
- network parameters of the query (IP address of the operator device or provider device, as well as port(s) thereof);
- the address and/or domain of the resource on which the advertisement will be displayed;
- a set of addresses and/or domains of resources that the subscriber visited immediately prior to the advertising display query;
- information about the location of the subscriber device (geolocation);
- socio-demographic data from CRM and other systems for tracking subscribers/network users (gender, age, etc.);
- the interests and preferences of the subscriber identified by analyzing the subscriber's behaviour in the network, in particular, the queried and visited Internet resources and/or other actions, including viewing of advertisements.

Thus, the present solution provides collecting and generating a data set for targeting advertising by identifying and comparing various identifiers of the subscriber device and/or the subscriber/user and user data available in various programs and EIS, including but not limited to: browsers, download managers, mobile and desktop applications, CRM, DMP, DPI, etc.

For instance, collecting and generating a data set for targeting advertising by matching any available data from various sources can be performed as follows. Based on the translated IP address, the RTDM system receives the source IP address, then, using this information, the MAC address of the subscriber device is determined, which is then matched with any associated information stored in a first database, e.g. the phone number and name of the subscriber ("subscriber name" in this case can be understood to refer to any set of characters, e.g. login name, nickname, etc.); then, using the received subscriber name, the RTDM system matches age and gender information for this subscriber from a second database (moreover, it is possible that the name used corresponds to several subscribers of different ages); then places frequented by the subscriber (all subscribers with the same name) are determined (matched) using data from a third database; then data regarding the current location of the subscriber is received from a fourth database, and so on. Moreover, as a result of matching the data, a specific subscriber is determined (the rest of the subscribers with the same name are discarded as failing to match certain data after matching all available data), and the most currently suitable advertisement for the subscriber is subsequently selected. In another example, data processing and profiling subsystem(s) (DMP, etc.) assign the subscriber a code for a certain group (a user segment united by one or more common characteristics), e.g. women, 25-35 years of age, the phone model used, high level income, frequent specific stores, regularly use the Internet in the subway at a certain section thereof, and the more parameters/characteristics of the subscriber are determined, the more accurately the advertising is selected. In general, the RTDM system receives data from the NAT service and, based on the received data, selects (matches) other data about a specific subscriber, wherein NAT data can be generated in various ways, e.g. by a router or server that can perform network address translation, or using DPI wherefrom the RTDM system can query data in real time.

A separate actively developing area of online advertising is advertising on systems/devices intended for receiving and/or viewing video content which are connected to the Internet without using browsers, including but not limited to: digital television receivers (Set-Top Boxes, STB), gaming consoles, SmartTV and IPTV systems, video-on-demand (VOD) systems, systems based on OTT (Over-the-Top) technology, etc. The most significant problem encountered in the field of targeting advertising to users of such devices is that such devices/systems cannot form and transmit data about the user and the history of his/her actions to external systems in the same way as ordinary browsers and/or mobile applications do.

In order to identify a potential recipient of targeted advertising (user and/or SD), the RTDM system does not require cookies and user/SD identifiers derived therefrom, as well as third party data about the user and/or his/her behaviour, including but not limited to: keywords used in Internet searches, user profiles on social networks, history of visited web pages, etc. Thus, the participants in the advertising display system (such as advertising exchanges, DSP, SSP) can receive data from the RTDM system that is sufficient to analyze the behaviour of users viewing the content and, therefore, even in such conditions it is possible to provide effective targeting of advertising in real time using the RTDM system.

It should also be noted that according to the present invention, the RTDM system uses NAT data received from the network equipment of the operator or provider, which allows unambiguous identification of a potential recipient of targeted advertising (user/SD) in real time in order to match a query for targeted advertising with user/SD characteristics. Therefore, the technical result provided when using the proposed solution is establishing an unambiguous reliable matching between the advertising query and the characteristics of the subscriber/user and their SD in real time, which in turn provides:

selection of targeted advertising for a specific subscriber/ SD in real time if there is no data or insufficient data about the user and his/her device for using standard targeting tools provided by advertising display systems, including those operating using the OpenRTB protocol,
   confirmation that the advertising query belongs to a real subscriber, which therefore allows using the present solution to counteract "bots" and other means of deceiving advertisers in online advertising ("anti-fraud").

An example of improving the effectiveness of advertising by determining whether an advertising query belongs to a real user is as follows. When purchasing a certain number of advertisement views by a target audience, the advertiser aims at the maximum "response" of the target audience. However, most of such views can be requested by special software for automatic viewing of advertisements (so-called "bots"), and thus most of the views will be displayed not to real users, but to artificial viewing tools, and therefore will not bring the result expected by the advertiser. In the case of "bots", the advertiser can receive only a small part of the views by real people (users), whereas when using the RTDM system, the advertiser has the opportunity to identify real users and not waste advertisement views on "bots", and therefore the advertising message will be shown to a larger number of real people, respectively, and the effectiveness of the certain purchased number of views for this advertising or informational message will be higher. This example also applies to the case of sending informational messages of a non-advertising nature, and due to the use of the RTDM module, such informational messages reach a larger number of real people.

So, for example, in the event of an emergency, timely notification of people whose life and health will be at risk is of utmost importance. In such situations, all responsibility falls on the existing warning systems. The use of user notification systems utilizing the RTDM system allows, for example, to warn more people about the danger in timely manner and to start evacuating in time, which significantly reduces the number of victims in emergency situations.

It should also be noted that in order to achieve the above result, no action is required from the user/subscriber (including but not limited to: changing the settings of the subscriber device, installing additional software, etc.), and the speed of delivery of the advertising or informational message does not significantly differ from that achieved using other targeting tools under similar conditions.

Thus, in contrast to the prior art methods, the RTDM system for providing identification of a potential recipient (user/SD) of targeted advertising in real time:

1. does not require installing any additional services in the network perimeter of the operator or provider, and therefore does not affect user experience and traffic flow and does not necessitate changes to the existing business processes of the operator or provider, quality of service (QoS) and other factors involved in the interaction between the subscriber/user and the operator or provider;

2. does not require interception and preliminary processing of third party traffic using any special means and/or services (e.g. proxy, adroxy, etc.), particularly those using certificate substitution or other detection methods, and further does not require using any other service receiving queries from the user directly in the operator or provider network;

3. can function effectively when using any protocols of the TCP/IP stack, including the HTTPS protocol.

Therefore, the present invention does not use any additional means or methods that affect the existing process of interaction between the SD and an external service such as SSP, DSP or any other service.

It should be noted that the present invention can be used to generate not only targeted advertising content for the corresponding user but also to generate non-advertising informational messages for the corresponding user, and therefore all of the examples, variations and modifications presented above and covered in the claims, can be applied with modifications apparent to those skilled in the art to generate informational messages of a non-advertising nature, if necessary.

The invention claimed is:

1. A method for matching and collecting user data and/or user device data within a current Internet access session of a user, the method used with an operator device or a provider device and performed outside an operator network perimeter or a provider network perimeter, for a user notification system that generates informational messages in real time, the method comprising:
   receiving a source IP address and a source user device port and a corresponding translated IP address and a translated port of the operator or the provider from the operator device or the provider device carrying out network address translation (NAT), wherein the receiving is performed using a NetFlow or IPFIX protocol,
   receiving a query for reception of the user data and/or the user device data from the user notification system, the query containing the translated IP address and the translated port of the operator or the provider, and
   matching the user data and/or the user device data from all available sources, including but not limited to operator or provider databases, using the source IP address and the received source user device port identified based on the translated IP address and the translated port received from the user notification system,
   collecting the matched user data and/or the user device data from said available sources, and
   directing the collected matched user data and/or the user device data to the user notification system.

2. The method according to claim 1, further comprising determining a unique user identifier (UID) and data corresponding to the UID based on the identified source IP address and the source user device port, and collecting the matched user data and/or the user device data using the unique user identifier (UID) and the data corresponding to the UID.

3. The method according to claim 1, wherein the available data sources include various means and enterprise information systems (EIS), including but not limited to: browsers, download managers, mobile and desktop applications, customer relationship management (CRM), data management platform (DMP), deep packet inspection (DPI).

4. A non-transitory computer readable media medium having stored thereon instructions to implement the method of claim 1.

* * * * *